(12) United States Patent
Stakutis et al.

(10) Patent No.: US 7,971,096 B2
(45) Date of Patent: *Jun. 28, 2011

(54) SYSTEM AND ARTICLE OF MANUFACTURE FOR SYSTEM RECOVERY

(75) Inventors: Christopher John Stakutis, Concord, MA (US); Kevin Michael Stearns, Maynard, MA (US); Jennifer Martin Shaw, North Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 609 days.

This patent is subject to a terminal disclaimer.

(21) Appl. No.: 12/054,894

(22) Filed: Mar. 25, 2008

(65) Prior Publication Data

US 2008/0172558 A1 Jul. 17, 2008

Related U.S. Application Data (63) Continuation of application No. 10/965,163, filed on Oct. 14, 2004, now Pat. No. 7,370,234.

(51) Int. Cl.
    *G06F 11/00* (2006.01)
(52) U.S. Cl. ............................................. 714/15; 713/2
(58) Field of Classification Search ........................ None
    See application file for complete search history.

(56) References Cited

U.S. PATENT DOCUMENTS

| | | | |
|---|---|---|---|
| 5,627,964 A * | 5/1997 | Reynolds et al. | 714/46 |
| 6,175,917 B1 * | 1/2001 | Arrow et al. | 713/1 |
| 6,178,503 B1 * | 1/2001 | Madden et al. | 713/2 |
| 6,195,695 B1 * | 2/2001 | Cheston et al. | 709/221 |
| 6,381,694 B1 | 4/2002 | Yen | |
| 6,615,365 B1 * | 9/2003 | Jenevein et al. | 714/6 |
| 6,915,420 B2 * | 7/2005 | Hensley | 713/2 |
| 6,948,099 B1 * | 9/2005 | Tallam | 714/38 |
| 7,089,449 B1 * | 8/2006 | Cluff et al. | 714/15 |
| 7,131,026 B2 * | 10/2006 | Denninghoff et al. | 714/6 |
| 7,219,257 B1 * | 5/2007 | Mahmoud et al. | 714/6 |
| 2002/0053044 A1 * | 5/2002 | Gold et al. | 714/38 |
| 2002/0188837 A1 * | 12/2002 | Dayan et al. | 713/2 |
| 2003/0221095 A1 | 11/2003 | Gaunt et al. | |
| 2004/0044707 A1 | 3/2004 | Richard | |

FOREIGN PATENT DOCUMENTS

EP 1096381 5/2001

OTHER PUBLICATIONS

First Office Action for U.S. Appl. No. 10/965,163, dated Jul. 18, 2007, 13 pgs.
Response to First Office Action for U.S. Appl. No. 10/965,163, dated Oct. 18, 2007, 15 Pgs.
Notice of Allowance for U.S. Appl. No. 10/965,163, dated Dec. 26, 2007, 16 pgs.

* cited by examiner

*Primary Examiner* — Gabriel L Chu
(74) *Attorney, Agent, or Firm* — Rabindranath Dutta; Konrad Raynes and Victor LLP (57) ABSTRACT

Provided are a system, and article of manufacture for system recovery. An operating system and a backup copy of the operating system are both maintained in a partition of a computational device. A boot loader receives an indication to load the backup copy of the operating system. The boot loader loads the backup copy of the operating system. The computational device is rebooted with the loaded backup copy of the operating system.

16 Claims, 6 Drawing Sheets

SYSTEM AND ARTICLE OF MANUFACTURE FOR SYSTEM RECOVERY

CROSS-REFERENCE TO RELATED APPLICATIONS

This application is a continuation of application Ser. No. 10/965,163 filed on Oct. 14, 2004, which is incorporated herein by reference in its entirety.

BACKGROUND

1. Field

The disclosure relates to a system, and article of manufacture for system recovery.

2. Background

A computational device may be susceptible to operating system failures that render the computational device unbootable even though the hardware of the computational device is fully functional. For example, the operating system that runs on the computational device may be corrupted by newly loaded errant software or by accidental destruction of critical operating system files. In certain situations, malicious viruses may deliberately attack the operating system to render the computational device unbootable or destroy the general operation of the computational device. In such a situation, a user may have to reload the operating system. Reloading the operating system from external media, such as, compact disks or digital video disks, is time consuming and may not always be practical.

A user may reboot the computational device from a previously created disk partition which is loaded with a backup operating system image that is capable of executing on the computational device. For example, if the operating system image on a first disk partition is corrupted then the backup operating system image from a second disk partition may be loaded to reboot the computational device.

A plurality of versions of an operating system can be installed on a single computational device in a plurality of directories. For example, Windows XP* and Windows 2000* may be installed on the same computational device in different directories. Even the same operating system, such as, Windows XP*, can be installed twice in two different directories of the same computational device. In certain Microsoft Windows* environments, a user may power on the computational device and select one of the plurality of directories to boot into the corresponding operating system stored in the selected directory.

* Windows, Windows XP, Windows 2000 are trademarks of Microsoft Corp.

SUMMARY OF THE DESCRIBED EMBODIMENTS

Provided are a method, system, and article of manufacture for system recovery. An operating system and a backup copy of the operating system are both maintained in a partition of a computational device. A boot loader receives an indication to load the backup copy of the operating system. The boot loader loads the backup copy of the operating system. The computational device is rebooted with the loaded backup copy of the operating system In certain embodiments, a file system filter is executed on a native file system driver of the operating system. The file system filter protects the backup copy of the operating system from alteration.

In certain additional embodiments, a same directory structure is maintained for files of the operating system and files of the backup copy of the operating system, and wherein the files of the operating system and the files of the backup copy include an operating system kernel, an windowing program, and at least one device driver.

In yet additional embodiments, a first indicator stores a location of the backup copy of the operating system, and a second indicator stores a location from which the boot loader loads the operating system. The loading of the backup copy of the operating system comprises copying, by the boot loader, the location of the backup copy of the operating system from the first indicator to the second indicator. The boot loader reads the second indicator to determine a location from which to load programs to reboot the computational device. The boot loader initiates a loading of the programs to reboot the computational device from the determined location.

In certain embodiments, a file system filter protects the backup copy of the operating system from alteration, wherein the file system filter stores in a first indicator a location of the backup copy of the operating system, and wherein in response to the indication the boot loader uses the first indicator to populate a boot directory name field that is used to load the operating system.

In additional embodiments, a plurality of backup copies of the operating system are stored in the partition, and wherein the boot loader loads one of the plurality of backup copies of the operating system in response to a corruption of the operating system.

In further embodiments, storage of the operating system and the backup copy of the operating system in the partition allows a substitution of the operating system with the copy of the operating system without a block by block copying of the operating system by the boot loader.

In yet further embodiments, a corruption of the operating system and a usage of the backup copy of the operating system for the rebooting causes no loss of user data in the computational device.

In still further embodiments, the boot loader is stored in the Read Only Memory (ROM) of the computational device, wherein the operating system is corrupted, and wherein loading of the corrupted operating system by the boot loader causes a reboot of the computational device to fail.

In additional embodiments, a first directory includes the operating system and a second directory includes the backup copy of the operating system. The backup copy of the operating system is created in response to a command from a user. The second directory is renamed to the first directory to use the backup copy of the operating system to reboot the computational device. The backup copy of the operating system is updated, wherein the updated backup copy of the operating system is used to reboot the computational device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain situations, a second disk partition may not be available for storing a backup operating system image to recover from operating system errors. For example, many computers are shipped with the entire physical hard drive pre-formatted as a single partition. Therefore, a user may endure a time consuming process to re-partition the physical hard drive to create a second disk partition. Additionally, once a partition is created the size of the partition is fixed and the partition may hold a single operating system image. Expanding the partition to hold additional operating system images may include a re-partitioning of the hard disk. Furthermore, whatever space is put aside for the partition may not be available for storing user data and user applications. If a user had a temporary need for more disk space it may be difficult to reclaim the space from the partition. Furthermore, block by block copying of the operating system from one partition to another can be time consuming. Additionally, the corruption of the operating system on a partition may lead to the loss of user data and user applications stored on the partition when the partition is overwritten with an uncorrupted version of the operating system.

Provided are certain embodiments that allow a computing device to reboot successfully with a backup copy of an operating system. In certain embodiments, the backup copy of the operating system is stored in the same partition as the corrupted copy of the operating system. In certain additional embodiments, neither any spare disk partition is required nor is any user data lost while rebooting the computing device from the backup copy of the operating system.

Figure 1:
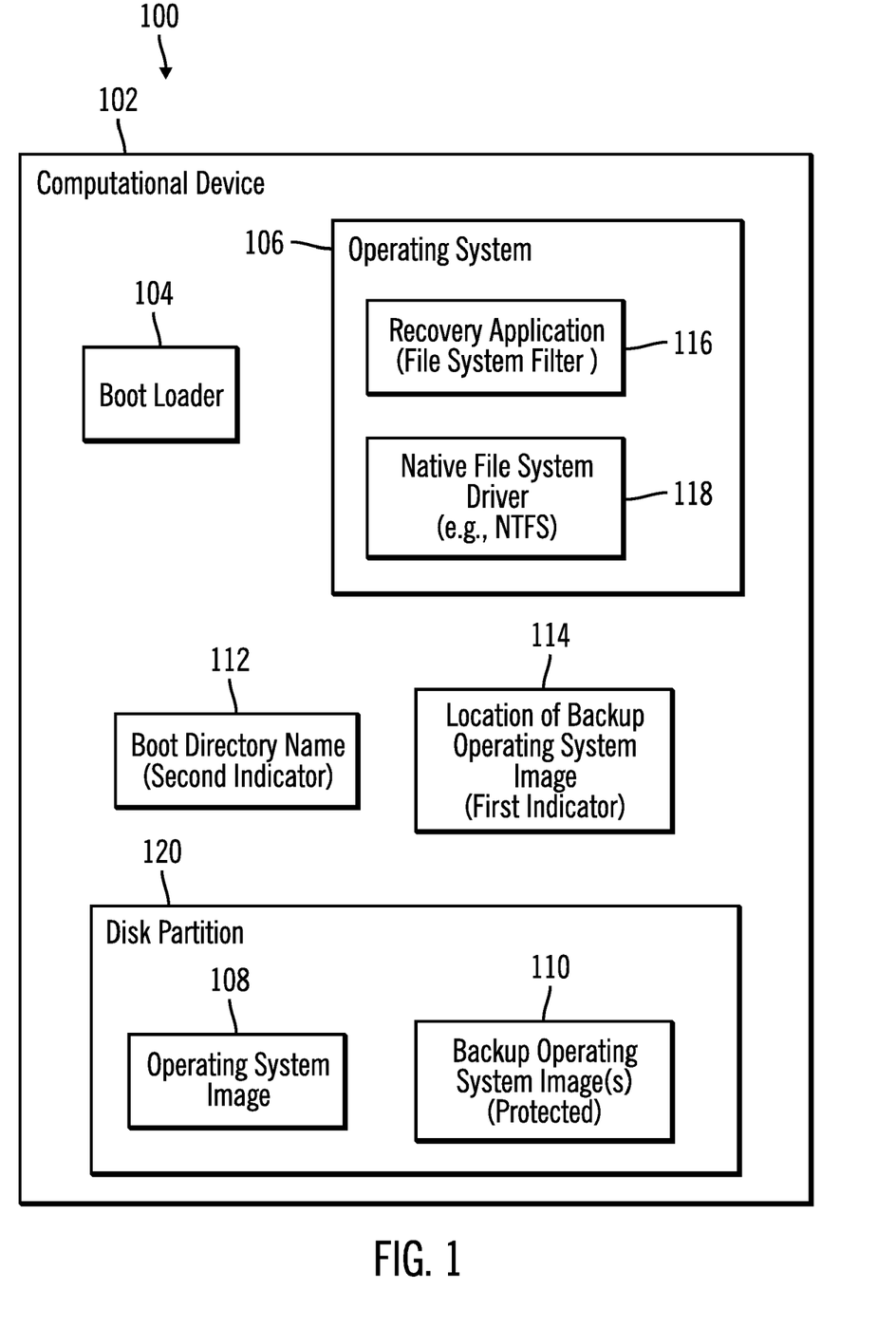
FIG. 1 illustrates a block diagram of a computing environment in accordance with certain embodiments.

FIG. 1 illustrates a block diagram of a computing environment 100 in accordance with certain embodiments. In certain embodiments, the computing environment 100 may comprise a computational device 102. The computational device 102 may be any computational device known in the art, such as a personal computer, a workstation, a server, a mainframe, a hand held computer, a palm top computer, a telephony device, a network appliance, a blade computer, etc. While FIG. 1 shows a single computational device 102, in certain alternative embodiments the computing environment 100 may comprise a plurality of computational devices coupled over a network, where the plurality of computational devices are controlled by a distributed operating system that may be corrupted.

The computational device 102 may comprise a boot loader 104, an operating system 106 that executes in the computational device 102, where the files to be loaded for executing the operating system 106 are stored in an operating system image 108. The computational device 102 also includes a backup of the operating system image 110, a boot directory name 112, and a location of the backup operating system image 114.

In certain embodiments, the computational device 102 can execute code found in the memory, such as, Read Only Memory (ROM) or Random Access Memory (RAM). Subsequent to the computational device 102 being powered on, the computational device 102 does not have the operating system 106 in memory. The hardware of the computational device 102 alone cannot perform the operations of the operating system 106, such as, loading a program from disk, executing graphical user interfaces, etc. The boot loader 104 is a relatively smaller program than the operating system 106, where is boot loader 104 is capable of loading enough other software for the operating system 106 to start, i.e., the boot loader 104 loads the operating system 106. In certain embodiments, the boot loader 104 may be stored in the ROM Basic Input/Output System (BIOS).

In certain embodiments, the boot directory name 112 may store the location of the operating system image 108. The boot loader 104 may read the boot directory name 112 to determine the location of the operating system image 108 and load the operating system image 108 from the determined location.

In certain embodiments, the operating system 106 may comprise a recovery application 116 and a native file system driver 118. In certain embodiments, where the operating system 106 is the Microsoft Windows* Operating System, the native file system driver 118 may be an New Technology File System (NTFS) driver that manages an NTFS file system. In certain embodiments, the file system driver 118 allows the recovery application 116 to protect the files of the backup operating system images 110 from alteration while the operating system 106 is running on the computational device 102. The recovery application 116 is also capable of storing the location 114 of the backup operating system image 110.

In certain embodiments, the operating system image 108 and the backup operating system image 110 are stored in a same disk partition 120, where the disk partition 120 is a partition of a disk included or coupled to the computational device 102. In certain embodiments, there may only be a single disk partition.

Therefore, FIG. 1 illustrates an embodiment in which a single disk partition 120 maintains the operating system image 108 and a backup of the operating system image 110 where the backup of the operating system image 110 is a copy of the operating system image 108. The recovery application 116 protects the backup of the operating system image 110 from alteration. In certain embodiments, in the event of a corruption of the operating system 106 the boot loader 104 may load the backup operating system image 110 to reboot the computational device 102.

Figure 2:
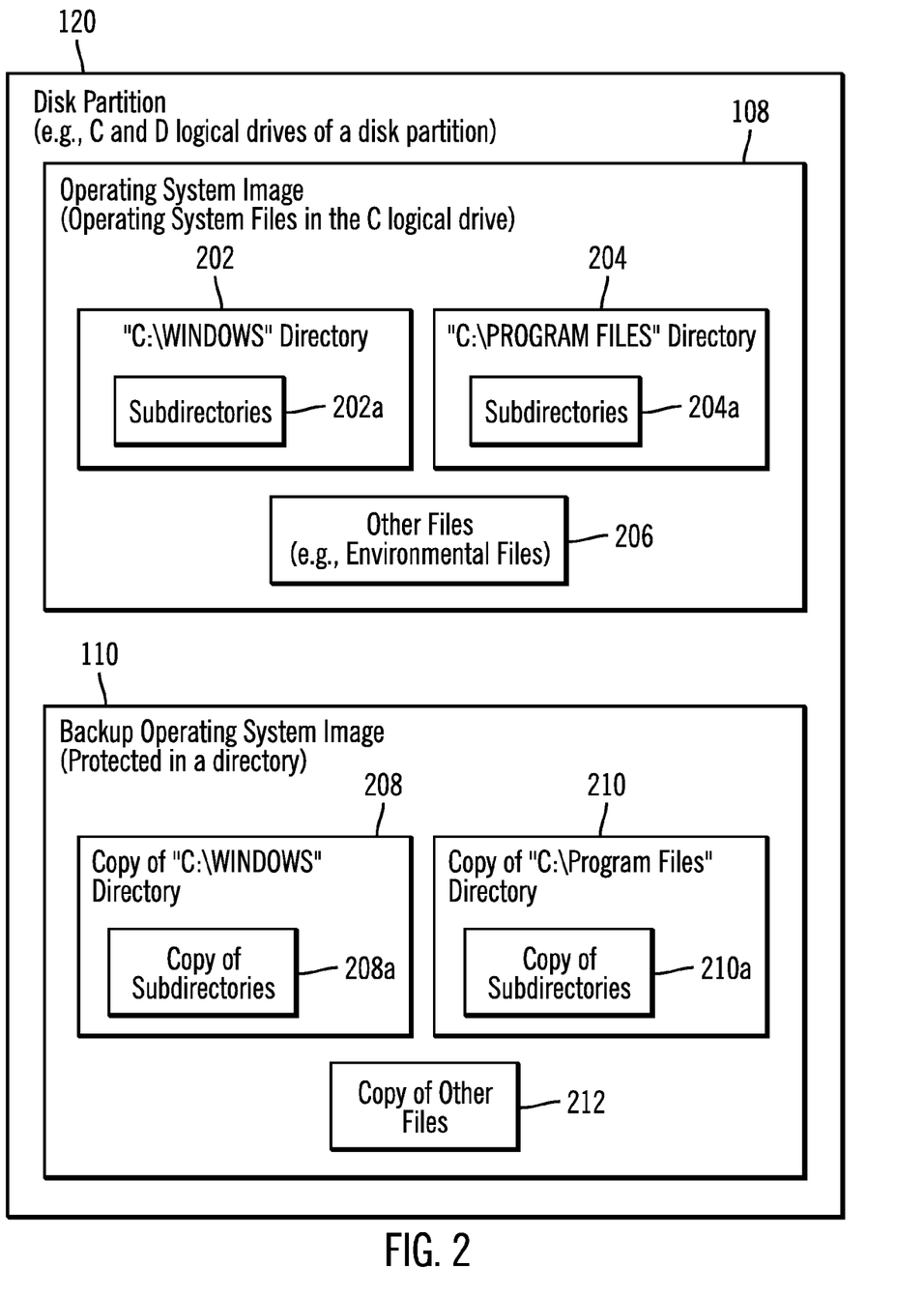
FIG. 2 illustrates a block diagram of an operating system image and a backup operating system image, in accordance with certain embodiments corresponding to the computing environment.

FIG. 2 illustrates a block diagram of the operating system image 108 and the backup operating system image 110, in accordance with certain exemplary embodiments corresponding to the computing environment 100.

In certain exemplary embodiments, the computational device 102 maintains the operating system image 108 and the backup operating system image 110 in the same disk partition 120. For example, in an exemplary embodiment, the operating system image 108 and the backup operating system image 110 may be stored in the logical directories, where the logical directories belong to the same disk partition 120.

In certain embodiments, where the operating system 106 is a version of Microsoft Windows*, the files comprising the operating system image 108 may be stored in a plurality of hierarchical directories and files, such as a "C:\WINDOWS" directory 202 including subdirectories 202a, a "C:\PROGRAM FILES" directory 204 including subdirectories 204a, and other files 206, such as, environmental files. The names and arrangement of files shown in the operating system image 108 are exemplary and other arrangements of files and different files are possible in other operating systems. The files of the operating system image 108 and the backup 110 of the operating system image may include an operating system kernel, an windowing program, and at least one device driver.

In certain embodiments, the backup operating system image 110 has the same arrangement of files as the operating system image 108. For example, the backup operating system image 110 stores a copy (reference numeral 208) of the "C:\WINDOWS" directory 202 and a copy (reference numeral 208a) of the subdirectories 202a. The backup operating system 110 also stores a copy (reference numeral 210) of the "C:\PROGRAM FILES" directory 204 and a copy (reference numeral 210a) of the subdirectories 204a. Additionally, the backup operating system image 110 stores a copy (reference numeral 212) of the other files 206.

Therefore, FIG. 2 illustrates certain embodiments in which the directory structure of the operating system image 108 is maintained in the backup operating system image 110, where the operating system image 108 and the backup operating system image 110 are stored in the same disk partition.

Figure 3:
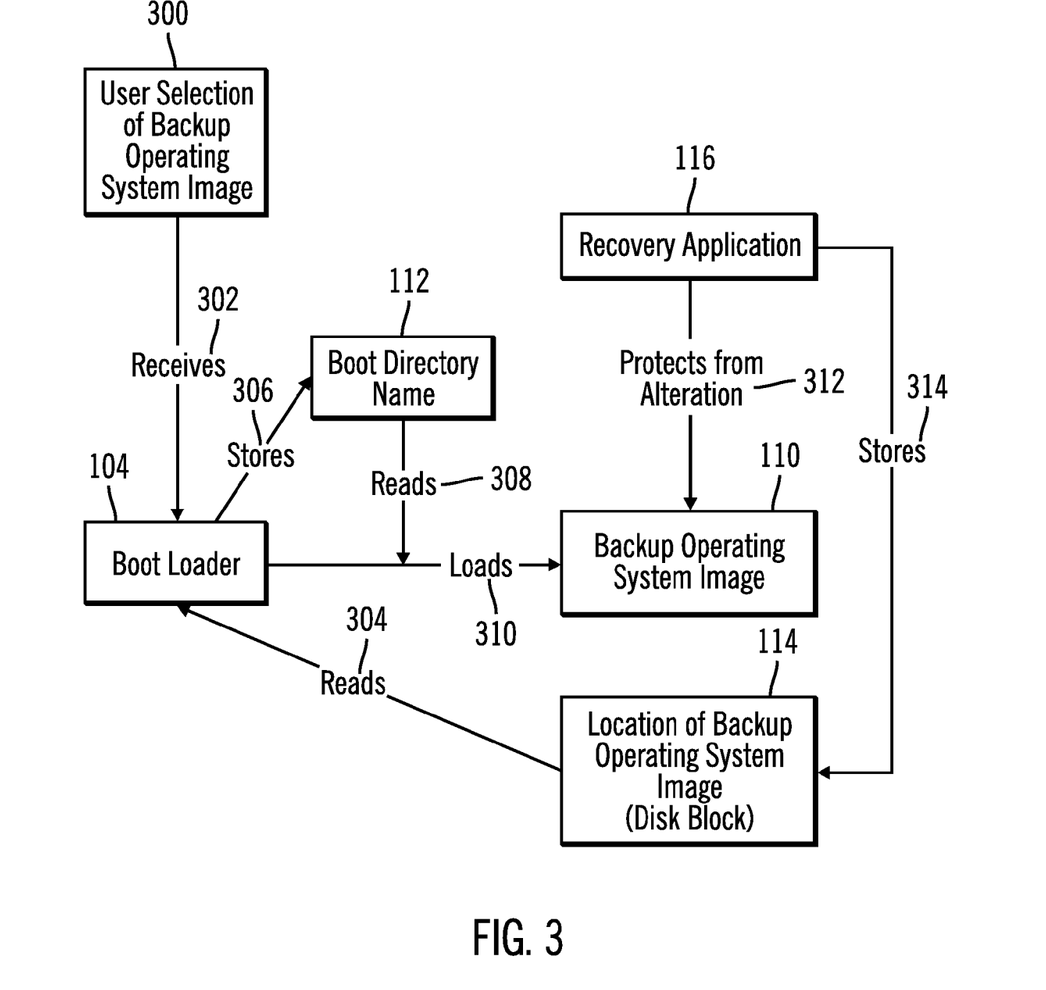
FIG. 3 illustrates a block diagram for system recovery, in accordance with certain embodiments corresponding to the computing environment.

FIG. 3 illustrates a block diagram for system recovery implemented in the computational device 102, in accordance with certain embodiments corresponding to the computing environment 100.

The boot loader 104 may provide a user with a choice from which the user makes a selection of an operating system image to load during a reboot of the computational device 102. For example, the user may select the backup operating system image 110 for loading in case of a failure to reboot from the operating system image 108 in a prior reboot of the computational device 102. In certain embodiments the user selection (reference numeral 300) of the backup operating system image 110 is received (reference numeral 302) by the boot loader 104. The boot loader 104 reads (reference numeral 304) the location of the backup operating system image 114 and stores the location in the boot directory name 112.

Subsequently, the boot loader 104 reads (reference numeral 308) the boot directory name 112 that points to the backup operating system image 110, and based on the reading loads (reference numeral 310) the backup operating system image 110. The backup operating system image 110 reboots the computational device 102. As a result, the computational device 102 may reboot even when the operating system image 108 is corrupted.

The recovery application 116 protects (reference numeral 312) from alteration the backup operating system image 110 by acting as a file system filter over the native file system driver 118, i.e., modifications to files are filtered through the recovery application 116. The recovery application 116 also stores (reference numeral 314) the location of the backup operating system image 114.

Therefore, FIG. 3 illustrates certain embodiments in which the recovery application 116 protects the backup operating system image 110 from alteration and the boot loader 104 loads the backup operating system image 110 in the event of a corruption of the operating system image 108.

Figure 4:
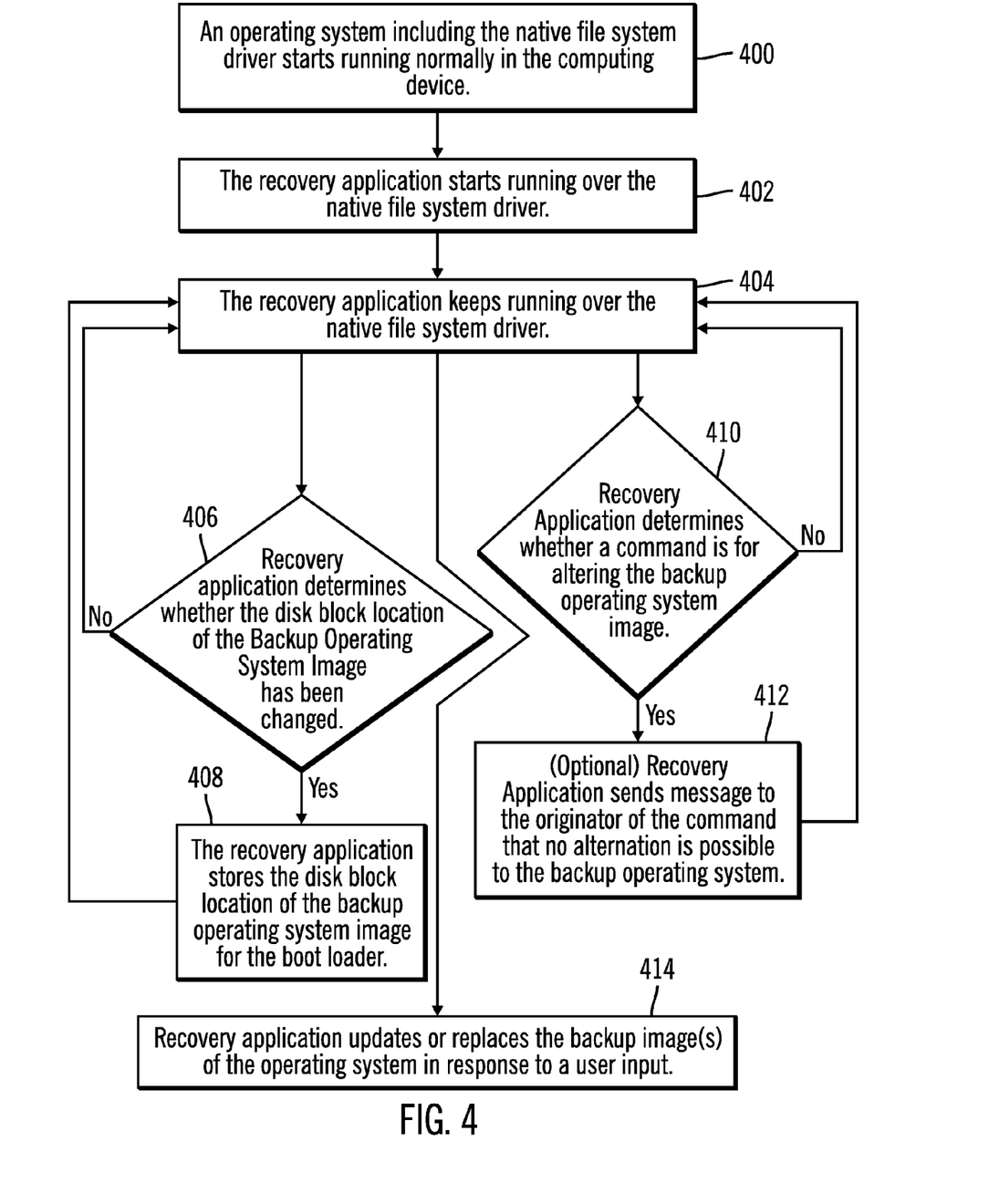
FIG. 4 illustrates operations implemented in a recovery application, in accordance with certain embodiments corresponding to the computing environment.

FIG. 4 illustrates certain operations implemented in the recovery application 116 executing in the computing device 102, in accordance with certain embodiments corresponding to the computing environment 100.

Control starts at block 400, where the operating system 106 including the native file system driver 118 starts running on the computational device 102. The operating system 106 is running normally, i.e., the operating system 106 is not corrupted, on the computational device 102. The recovery application 116 which is also included in the operating system 106 also starts (at block 402) running over the native file system driver 118 on the computational device 102. The recovery application 116 continuously keeps executing (at block 404) on the computational device 102.

From block 404, control proceeds to block 406, where the recovery application 116 determines whether the disk block location 114 of the backup operating system image 110 has been changed. In certain operating systems, the backup operating system image 110 can be located in different locations at different times. However, the recovery application 116 can determine and store the location 114 of the backup operating system image.

If the recovery application 116 determines (at block 406) that the disk block location 114 of the backup operating system image 110 has been changed, then the recovery application 116 stores (at block 408) the disk block location 114 of the backup operating system image 110 for use by the boot loader 104. Control returns to block 404, where the recovery application 116 continues to keep running. Additionally, if the recovery application 116 determines (at block 406) that the disk block location 114 of the backup operating system image 110 has not been changed then the recovery application 116 continues (at block 404) to keep running.

From block 404, control can also proceed in parallel to block 410, where the recovery application 116 determines whether a command is for altering the backup operating system image 110. If so, the recovery application 116 may optionally send (at block 412) a message to the originator of the command that no alteration is possible to the backup operating system image 110 and the recovery application 116 continues (at block 404) to run. If the recovery application 116 determines (at block 410) that the command is not for altering the backup operating system image 110, then control returns to block 404 and the recovery application 116 continues to run.

From block 404, control can also proceed in parallel to block 414 where the recovery application 116 updates or replaces the backup image(s) of the operating system in response to a user input. Such update or replacement of the backup image may be performed periodically in response to a user input to save a current copy of a correctly executing operating system and correctly executing environment files. While updating or replacing the backup operating system image 110 the recovery application 116 restricts alterations to the operating system image 108.

Therefore, FIG. 4 illustrates certain embodiments in which the recovery application 116 prevents alterations to the backup operating system image 110 and updates the location 114 of the backup operating system image 110 for the boot loader 104 to use. The recovery application 116 also allows updates or replacements of the backup operating system image 110 in response to a user input.

Figure 5:
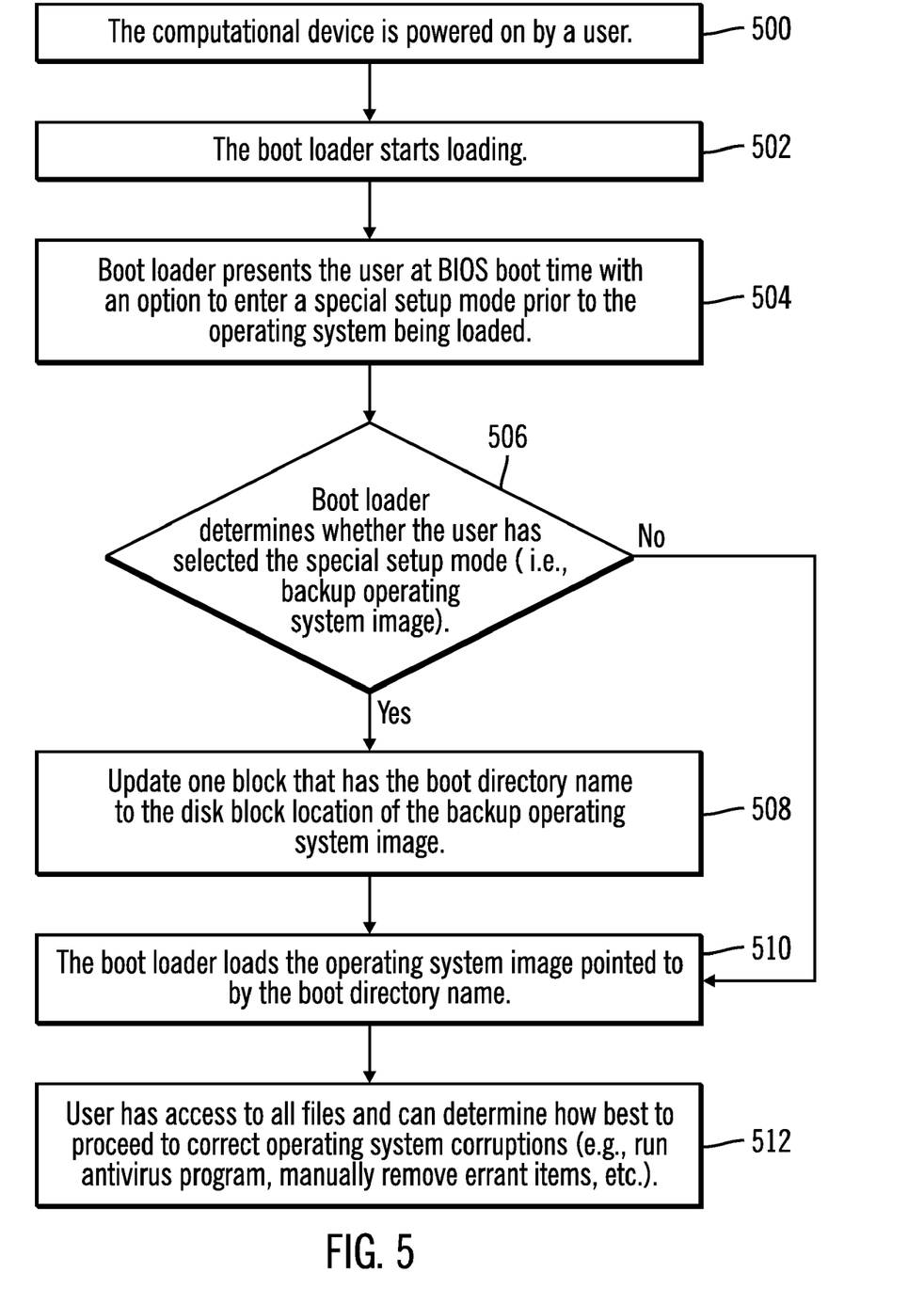
FIG. 5 illustrates operations implemented in a boot loader, in accordance with certain embodiments corresponding to the computing environment.

FIG. 5 illustrates operations implemented in a boot loader 104 of the computational device 102, in accordance with certain embodiments corresponding to the computing environment 100.

Control starts at block 500, where a user powers on the computational device 102. The boot loader 104 starts (at block 502) loading and presents (at block 504) the user at BIOS boot time an option to enter a special setup mode prior the loading of an operating system.

The boot loader 104 determines (at block 506) whether the user selected the special setup mode, where the special setup mode may be for using the backup operating system image 110 instead of a corrupted operating system image 108. If the boot loader 104 determines (at block 506) that the user selected the special setup mode, then the boot loader 104 updates (at block 508) one block that has the boot directory name 112 to the disk block location 114 of the backup operating system image 110.

The boot loader 104 loads (at block 510) the operating system image pointed to by the boot directory name 112. Subsequent to the completion of the loading of an uncorrupted operating system image, the user has access to all files and can determine (at block 512) how best to proceed to correct operating system corruptions. For example, the user may run an antivirus program or manually remove errant files.

If the boot loader 104 determines (at block 506) that the user did not select the special setup mode then control proceeds to block 510 where the boot loader 104 loads the operating system pointed to by the boot directory name 112.

Therefore, FIG. 5 illustrates an embodiment in which the boot loader 104 loads a protected backup operating system image 110 in response to a user selection. The user selection may be made when the operating system image 108 may have been corrupted. The loading of the protected backup operating system image 110 allows for the recovery from operating system errors that prevent rebooting of the computational device 102.

Certain embodiments allow the restoration of a functional version of the operating system without requiring an additional partition. There is no limitation of the number of operating system images stored in the single partition 120 aside from total disk space availability. The recovery operating system image is usable substantially instantaneously, i.e., within a few seconds, because no block by block copying is involved.

In certain embodiments, the backup operating system image 110 is protected from any alteration during normal operation of the computational device 102. In certain other embodiments, a user may start with one operating system on the computational device 102 and then create a copy of the one operating system and the other necessary directory trees corresponding to the one operating system. Subsequently, the copy of the one operating system can be updated, possibly after loading certain new applications. When the updated operating system is stable, i.e., runs normally, for a period of time, the updated operating system may be backed up.

When a plurality of versions of an operating system are installed on a single computational device, a user may not copy the corresponding directory trees for correctly rebooting the computational device. There may be embedded files or pathnames and other pointers within a first directory tree and copying the first directory tree to a second directory tree may result in pointing back to the first directory tree which could have corrupt parts. For example, the first directory tree corresponding to a directory, such as, "C:\Windows", may have the Windows Registry, where certain items in the Windows Registry may have hardcoded directory paths such as "C:\Windows\application". If a user powers on the computational device and selects the second directory tree for rebooting, then if the first directory tree is corrupted, the second directory may have elements in the Windows Registry that point back to the corrupted tree of the first directory tree and the reboot may fail.

In certain embodiments, if there are two directories "C:\Windows" and "C:\Windows2", where the "C:\Windows2" directory includes the backup operating system image, then under user control the "C:\Windows" directory may be renamed to some other name, such as, "C:\Windows_old", for saving and the "C\Windows2" directory may be renamed to the "C:\Windows" directory. In this way, the backup operating system image included in the renamed directory is not corrupted and is suitable for correctly rebooting the computational device. In addition, in certain embodiments, since the user makes a backup copy of the operating system trees, the user need not re-install the operating system software, and therefore may not always need an additional operating system license.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 6:
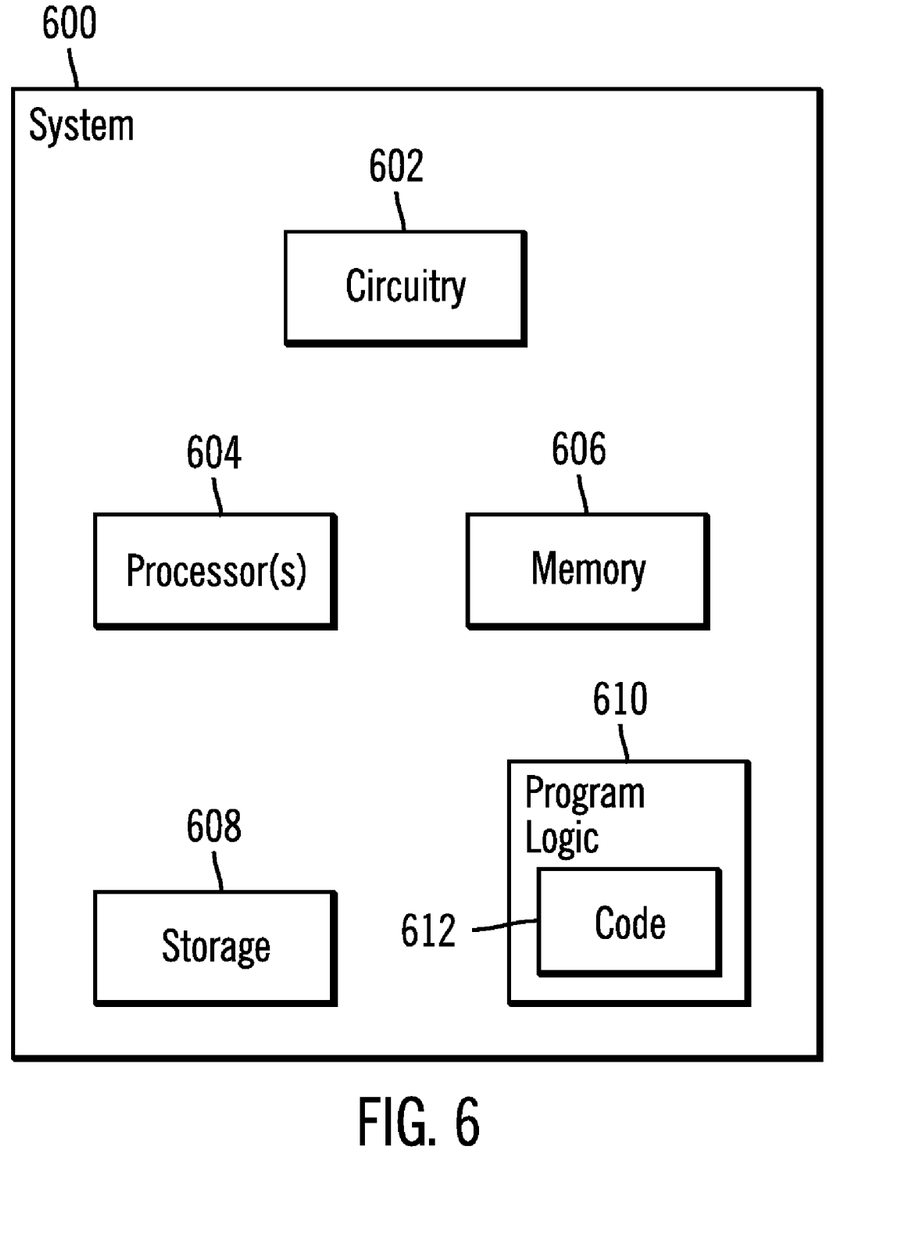
FIG. 6 illustrates a system in which certain embodiments are implemented.

FIG. 6 illustrates a block diagram of a system 600 in which certain embodiments may be implemented. In certain embodiments, the computational device 102 may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the computational device 102. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608.

At least certain of the operations of FIGS. 4, 5 may be performed in parallel as well as sequentially. In alternative embodiments, certain of the operations may be performed in a different order, modified or removed. In certain alternative embodiments, a plurality of backup copies of the operating system are stored in the same partition, and the boot loader loads one of the plurality of backup copies of the operating system in response to a corruption of the operating system.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A system, comprising:
   memory;
   a partition coupled to the memory; and
   circuitry coupled to the memory, wherein the circuitry is capable of:
   (i) maintaining both an operating system and a backup copy of the operating system in the partition;
   (ii) receiving, by a boot loader, an indication to load the backup copy of the operating system;
   (iii) loading, by the boot loader, the backup copy of the operating system; and
   (iv) rebooting the system with the loaded backup copy of the operating system, wherein a first indicator stores a location of the backup copy of the operating system, and a second indicator stores a location from which the boot loader loads the operating system, and wherein the loading of the backup copy of the operating system further comprises:
      (A) copying, by the boot loader, the location of the backup copy of the operating system from the first indicator to the second indicator;
      (B) reading, by the boot loader, the second indicator to determine a location from which to load programs to reboot the system; and
      (C) initiating, by the boot loader, a loading of the programs to reboot the system from the determined location.

2. The system of claim 1, wherein the circuitry is further capable of:
   executing a file system filter on a native file system driver of the operating system; and
   protecting, by the file system filter, the backup copy of the operating system from alteration.

3. A system, comprising:
   memory;
   a partition coupled to the memory; and
   circuitry coupled to the memory, wherein the circuitry is capable of:
   (i) maintaining both an operating system and a backup copy of the operating system in the partition;
   (ii) receiving, by a boot loader, an indication to load the backup copy of the operating system;
   (iii) loading, by the boot loader, the backup copy of the operating system; and
   (iv) rebooting the system with the loaded backup copy of the operating system, wherein a file system filter protects the backup copy of the operating system from alteration, wherein the file system filter stores in a first indicator a location of the backup copy of the operating system, and wherein in response to the indication the boot loader uses the first indicator to populate a boot directory name field that is used to load the operating system.

4. The system of claim 3, wherein a same directory structure is maintained for files of the operating system and files of the backup copy of the operating system, and wherein the files of the operating system and the files of the backup copy include an operating system kernel, an windowing program, and at least one device driver.

5. The system of claim 3, wherein storage of the operating system and the backup copy of the operating system in the partition allows a substitution of the operating system with the backup copy of the operating system without a block by block copying of the operating system by the boot loader.

6. The system of claim 3, wherein a corruption of the operating system and a usage of the backup copy of the operating system for the rebooting causes no loss of user data in the system.

7. The system of claim 3, wherein the boot loader is stored in the Read Only Memory (ROM) of the system, wherein the operating system is corrupted, and wherein loading of the corrupted operating system by the boot loader causes a reboot of the system to fail.

8. A system, comprising:
   memory;
   a partition coupled to the memory; and
   circuitry coupled to the memory, wherein the circuitry is capable of:
   (i) maintaining both an operating system and a backup copy of the operating system in the partition;
   (ii) receiving, by a boot loader, an indication to load the backup copy of the operating system;
   (iii) loading, by the boot loader, the backup copy of the operating system; and
   (iv) rebooting the system with the loaded backup copy of the operating system, wherein a first directory includes the operating system and a second directory includes the backup copy of the operating system, and wherein the circuitry is further capable of:
      (A) creating the backup copy of the operating system, in response to a command from a user;
      (B) renaming the second directory to the first directory to use the backup copy of the operating system to reboot the system; and
      (C) updating the backup copy of the operating system, wherein the updated backup copy of the operating system is used to reboot the system.

9. A computer readable storage medium including code wherein the code when executed causes operations in a computational device having a boot loader, the operations comprising:
   maintaining, in a partition of the computational device, both an operating system and a backup copy of the operating system;
   receiving, by the boot loader, an indication to load the backup copy of the operating system;
   loading, by the boot loader, the backup copy of the operating system; and
   rebooting the computational device with the loaded backup copy of the operating system, wherein a first indicator stores a location of the backup copy of the operating system, and a second indicator stores a location from which the boot loader loads the operating system, and wherein the loading of the backup copy of the operating system further comprises:

(i) copying, by the boot loader, the location of the backup copy of the operating system from the first indicator to the second indicator;
(ii) reading, by the boot loader, the second indicator to determine a location from which to load programs to reboot the computational device; and
(iii) initiating, by the boot loader, a loading of the programs to reboot the computational device from the determined location.

10. The computer readable storage medium of claim 9, the operations further comprising:
   executing a file system filter on a native file system driver of the operating system; and
   protecting, by the file system filter, the backup copy of the operating system from alteration.

11. A computer readable storage medium including code wherein the code when executed causes operations in a computational device having a boot loader, the operations comprising:
   maintaining, in a partition of the computational device, both an operating system and a backup copy of the operating system;
   receiving, by the boot loader, an indication to load the backup copy of the operating system;
   loading, by the boot loader, the backup copy of the operating system; and
   rebooting the computational device with the loaded backup copy of the operating system, wherein a file system filter protects the backup copy of the operating system from alteration, wherein the file system filter stores in a first indicator a location of the backup copy of the operating system, and wherein in response to the indication the boot loader uses the first indicator to populate a boot directory name field that is used to load the operating system.

12. The computer readable storage medium of claim 11, wherein a same directory structure is maintained for files of the operating system and files of the backup copy of the operating system, and wherein the files of the operating system and the files of the backup copy include an operating system kernel, an windowing program, and at least one device driver.

13. The computer readable storage medium of claim 11, wherein storage of the operating system and the backup copy of the operating system in the partition allows a substitution of the operating system with the backup copy of the operating system without a block by block copying of the operating system by the boot loader.

14. The computer readable storage medium of claim 11, wherein a corruption of the operating system and a usage of the backup copy of the operating system for the rebooting causes no loss of user data in the computational device.

15. The computer readable storage medium of claim 11, wherein the boot loader is stored in the Read Only Memory (ROM) of the computational device, wherein the operating system is corrupted, and wherein loading of the corrupted operating system by the boot loader causes a reboot of the computational device to fail.

16. A computer readable storage medium including code wherein the code when executed causes operations in a computational device having a boot loader, the operations comprising:
   maintaining, in a partition of the computational device, both an operating system and a backup copy of the operating system;
   receiving, by the boot loader, an indication to load the backup copy of the operating system;
   loading, by the boot loader, the backup copy of the operating system; and
   rebooting the computational device with the loaded backup copy of the operating system, wherein a first directory includes the operating system and a second directory includes the backup copy of the operating system, the operations further comprising:
   (i) creating the backup copy of the operating system, in response to a command from a user;
   (ii) renaming the second directory to the first directory to use the backup copy of the operating system to reboot the computational device; and
   (iii) updating the backup copy of the operating system, wherein the updated backup copy of the operating system is used to reboot the computational device.

* * * * *